Patented Aug. 14, 1951

2,564,092

UNITED STATES PATENT OFFICE 2,564,092

POLY-ETHYLENE POLY-AMINO ACID COMPOUNDS

Frederick C. Bersworth, Verona, N. J.

No Drawing. Application May 12, 1948,
Serial No. 26,726

7 Claims. (Cl. 260—534)

1

This invention relates to chemical compounds and has for its object the provision of a new type of amino acid compound which in aqueous solution is an effective sequestering agent for polyvalent metallic salts and compounds.

Another object is to provide a new type of amino acid compound which forms water soluble complexes with inorganic salts and compounds in aqueous solutions.

A further object is to provide a sequestering agent for alkaline pH solutions which is capable of holding in solution those metallic ions which are normally precipitable at the pH of the solution.

Other objects will be apparent as the invention is more fully hereinafter disclosed.

In accordance with these objects I have discovered that poly-ethylene poly-amino acids, such as the tri-ethylene tetra-amine tetra-acetic acid and its homologue amino acids, are effective sequestering agents for metallic salts and compounds in alkali pH solutions forming non-ionic complexes therewith which are normally stable in the presence of precipitants for the sequestered metal ion.

These poly-ethylene poly-amino acid compounds are formed by reacting a di-alkali metal salt of ethylene diamine di-acetic acid with ethylene di-chloride under conditions inducing the displacement of one or more of the remaining amino hydrogens of the ethylene diamine di-acetic acid with an ethylene group in accordance with the following reaction:

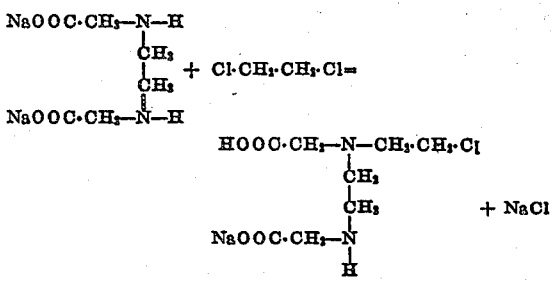

As indicated in this reaction the ethylene di-chloride displaces one of the remaining amino hydrogens with liberation of hydrogen chloride which is neutralized by the basic alkali metal ion of the carboxylic group of the di-acetic acid salt in which the displacement occurs.

By now reacting this reaction product with a second mole of the di-alkali metal salt of ethylene diamine di-acetic acid, the second chlorine atom of the ethylene di-chloride can be displaced with

2 formation of a chain-like poly-ethylene poly-amino acid of the following composition:

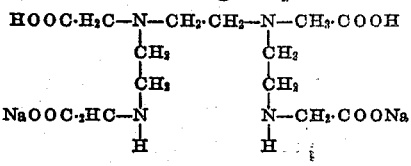

Either one of the remaining unsubstituted amino hydrogens of the two original ethylene diamine di-acetic acid molecules now may be displaced in a similar manner by ethylene di-chloride thereby forming longer-chained poly-ethylene poly-amino acids in which the end carboxylated amino groups each contain one amino hydrogen and the carboxylic group thereon is neutralized by a solubilizing alkali metal ion while the remaining carboxylic groups are all unneutralized as a result of reaction with the hydrogen chloride liberated in the displacement reaction. Such a long-chain poly-ethylene poly-amino acid salt may be written structurally as follows:

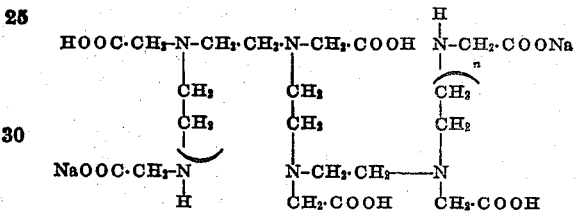

In this structural formula $n$ is a numeral indicating the total number of carboxylated amino nitrogen groups separated by ethylene ($CH_2 \cdot CH_2$) groups which are interposed between the end carboxylated amino nitrogen groups, which in the example indicated equals 4.

This compound by virtue of the solubilizing alkali metal ions neutralizing the carboxylic acid groups of the terminal amino nitrogens is soluble in water and in aqueous solution has a pH of about 8.5. On acidification of an aqueous solution of this di-alkali metal salt with a strong mineral acid to a pH of about 6.5–7, the free acid complex is precipitated as a white crystalline solid.

The presence of a plurality of acid carboxylic groups in interior position, each attached to an amino nitrogen through an aliphatic carbon group ($CH_2$)$_2$ in this compound enables the compound to be highly reactive as an acid towards basic compounds tending to be precipitated out of aqueous solution at the normal pH of about 8.5 of the compound, fixing the metallic constituents thereof as nonionized salts, the primary ionization of the polymolecular compound being at the end carboxylic groups.

As an example, the addition to an aqueous solution of this poly-ethylene poly-amino acid compound, having a normal pH of 8.5, of a metal salt which at this pH can be expected to precipitate out of solution as an oxide, hydroxide or basic hydrated metal salt, may in some cases result in some solution cloudiness which on standing or on heating clears up. Thereafter, the addition of a salt or compound to the solution which normally is a precipitating agent for the metallic ion of the added metal salt fails generally to produce any precipitation of the metallic ion, due to the fact that the metallic ion of the salt is now held in interior combination in the poly-molecular compound as an un-ionized salt compound.

The poly-metal salt compound thus formed is usually recoverable from solution at least in part as the di-acid, metal salt upon acidification of the solution with a strong mineral acid to an acid pH at which the salt has the lowest solubility, as in the case of the di-alkali metal poly-molecular compound. However, in the presence of excess amounts of the strong mineral acid the metal ions neutralizing the interior carboxylic groups normally are removed as salts of the mineral acid with precipitation of the poly-ethylene poly-amino acid compound as a free acid.

This particular unusual chemical property of this poly-ethylene poly-amino acid compound can be widely utilized in the art of chemistry and chemical processes. As an illustration, in the purification of many aqueous solutions of metallic salts containing small amounts of undesired associated metal impurities, the amino acid compound of the present invention can be employed to react with the undesired impurities to form poly-metallic salt compounds. The thus purified metal salt may then be precipitated out of solution away from the poly-metallic amino acid salts of the impurities and recovered in any convenient manner.

The addition of this poly-ethylene poly-amino acid compound to aqueous fatty acid soap solutions either before or after dissolving the soap compounds therein completely inhibits the formation of calcium, magnesium and heavy metal soap compounds or redissolves such precipitated soap compounds, as the case may be. The amount of such amino acid compound to be added to any given soap solution or volume of water prior to dissolving the soap compounds therein varies with respect to the number of acid carboxyl groups present in the amino acid compound and the amount of free caustic alkali and of calcium, magnesium or heavy metal soap compounds or ions present in the solution to be taken up by the amino acid compound, as one skilled in the art will recognize.

In general, I prefer to form the tri-ethylene tetra-amine tetra-acetic acid compound by the reaction above described.

This compound is formed in the following way:

Two moles of the di-sodium salt of ethylene diamine diacetic acid dissolved in an equal weight of water and one mole of ethylene di-chloride are heated in a water solution under a reflux condenser to a temperature of about 75–80° C. Alternatively, the ethylene di-chloride may be added in small amounts to the heated solution of the di-acetic acid salt and at a rate where it is reacted almost at once; or, in larger increment amounts so as to be present in excess during the course of the reaction as may be desired. The reaction time required depends somewhat upon which of these alternative methods is used, since an excess of the di-chloride lowers the reflux temperature. The lower the temperature the longer is the reaction time that must be allowed. Usually, where the di-chloride is added all at once, the ethylene di-chloride is fully reacted at the refluxing temperature specified within six hours. The resulting reaction product has a pH of approximately 8.5, and is a solution of the 2-sodium, 2-secondary amino di-acid salts of the tri-ethylene tetra-amine tetra-acetic acid. When the material is titrated with $CaCl_2$ in the presence of oxalate, a soluble amino acid complex is formed with two moles of calcium for every mole of the amino acid demonstrating that two molar equivalents are sequestered by this tetra amino acid, whereas ethylene diamine tetra-acetic acid is capable of sequestering one molar equivalent of calcium.

Where, in substitution for ethylene di-chloride, in the above specific example, propylene 1-2 di-chloride is used in equivalent amounts, a propylene substitution compound is produced which behaves chemically in a manner similar to the ethylene substitution compound.

Where in substitution for ethylene diamine di-acetic acid, in the above example, ethylene diamine di-methylene sulfonic acid is used in equivalent amounts, a poly-ethylene poly-amino sulfonic acid compound is produced which also behaves chemically in a similar manner.

As a second specific example:

Eight moles of the di-sodium salt of ethylene diamine di-acetic acid are treated as hereinabove described with four moles of ethylene di-chloride while maintaining the pH of the reaction solution at about 8.5 to 9.0 by the addition of $Na_2CO_3$ or caustic alkali thereto or alternatively and by preference in the presence of a buffer salt such as sodium acetate, distilling out the acetic acid formed in the form of a water-acetic acid mixture while keeping the solution volume constant by the addition of water. In this reaction the amount of the sodium carbonate or caustic alkali present or of the buffer salt sodium acetate, should be calculated to approximate that providing sufficient basic sodium ions to neutralize all of the carboxylic groups present in the poly-molecular amino compound. Sodium chloride is also formed as a reaction product in this reaction and sufficient water should be present in the reaction solution to at least keep the total solids present well dispersed. The poly-ethylene poly-amino acid compound formed in this reaction is believed to have the following structure:

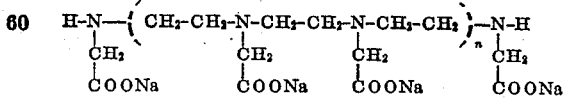

In this compound $n$ equals the numeral 2. It may be isolated from the reaction solution as the free acid by the addition of the calculated amount of mineral acid to acidify all carboxylic groups present with a sufficient excess of the acid to give a pH of about 2.0, the isoelectric point of the compound. The free acid is soluble in alcohol-water mixtures and the di-alkali metal salts of free acid are water soluble and form chelate complexes with both di- and tri-valent metals which are stable in alkali pH solutions. The tri-valent metal chelate complex is not precipitated from aqueous solution by the presence of, or by an excess of, the chelate complexes of other metals, especially di-valent metals.

By an exactly similar reaction the propylene analogue is formed, but this compound is more alcohol soluble than the ethylene type. When the di-sulfonic acid of ethylene diamine or propylene diamine is used the sulfonic acid analogue is formed.

It will be noted that in this reaction poly-ethylene poly-amino acids, are formed which have two terminal secondary amino hydrogens which may be substituted by additional amounts of poly-halides increasing the chain length of the compound or the compound may be reacted with other functional compounds, such as alkyl mono-halides, acyl chlorides, organic oxide, acid anhydride, acid chloride, etc., to form the corresponding derivatives thereof.

A similar completely neutralized reaction product is obtained when a polyamine such as ethylene diamine is reacted with a poly-halide using an alkali hydroxide or carbonate to combine with the hydrogen halide formed. An alternative method would be to carry on the reaction in the presence of sodium acetate and to distil out the acetic acid as it is formed. These completely neutralized poly-ethylene poly-amino acid compounds may be converted to the free acid by treatment with a strong mineral acid using a sufficient excess of the mineral acid to give a pH to the solution at which the free acid has the least solubility.

When ethylene diamine is treated with ethylene dichloride in such a way that the molar ratio of ethylene di-chloride to ethylene diamine is about 0.5 or higher, a reaction product is formed which has a large number of secondary amino groups. This is due to the occurrence of a large number of

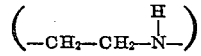

groups in the high molecular weight product. A considerable number of piperazine groups and other ethylenic bridges are also present, however.

Such a reaction product can then be reacted with sodium chloracetate in the presence of caustic alkali to produce a mixture of carboxylic amino products consisting of compounds containing straight chain and piperazine linkages. The proportion and distribution of such compounds in the mixture varies considerably with the poly-halides used, as well as with the time, temperature and solvent employed.

However, in the examples given above, the reacting secondary amino acids are "oriented" by the acidic groups and chain formation is favored to almost complete exclusion of side reaction products cited above. Also, since the amino acids as used are good anti-oxidants the small amount of oxidation and decomposition that usually takes place in the formation of products of this type does not discolor the reaction solution and the solution remains almost water-clear throughout and always results in the formation of clear white salts.

The poly-ethylene poly-amino acid compounds hereinabove disclosed have chemical properties which indicate wide utility of the same as an anti-oxidant; as plating adducts; as wetting and emulsifying agents; as fuel addition agents; as well as in the purification of aqueous solutions from undesired metal ions by the sequestering reaction described.

In addition to the solubilizing effect of the interiorly located acid carboxylic groups of these poly-ethylene poly-amino compounds, the neutralized mono- or poly-metal salts of these compounds possess the property of forming complexes with neutral inorganic salts present in solution therewith by the action of the residual valencies of the normally penta-valent nitrogen which are released for such complex-forming action upon neutralization of the carboxylic groups attached to each amino nitrogen.

Having hereinabove disclosed the present invention broadly and specifically and given several specific embodiments thereof, it is believed apparent that the same may be widely varied without essential departure therefrom and all modifications of the same are contemplated as may fall within the scope of the following claims.

What I claim is:

1. A poly-ethylene poly-amino acid conforming to the chain-like structure

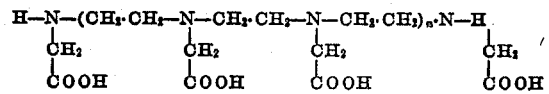

wherein $n$ is a numeral greater than 2 representing the total number of carboxylated amino nitrogen groups interposed between the amino nitrogen end groups with the amino nitrogens of each said amino nitrogen groups attached to two ethylene groups forming a chain between the end carboxylated amino nitrogen groups.

2. The di-alkali metal salt of the amino acid of claim 1, the carboxyl groups of the two end carboxylated amino nitrogens being neutralized by an alkali metal ion.

3. The alkali metal salt of the amino acid of claim 1, wherein all carboxylic groups of the acid are neutralized by an alkali metal ion.

4. The di-alkali metal-poly metallic salt of the amino acid of claim 1, wherein the two end carboxylic groups only are neutralized by an alkali metal ion and the remaining and interior carboxylic acid groups are neutralized with another metallic ion.

5. The method of producing chain-like poly-ethylene poly-amino acid compounds conforming to the structure defined in claim 1 which comprises reacting the di-alkali metal salt of ethylene diamine di-acetic acid with ethylene dichloride under conditions inducing the displacement of one of the amino hydrogens by the dichloride with resultant substitution of ethylene mono-chloride therefor and liberation of HCl for neutralization by the alkali metal ion of the di-acetic acid and reacting the resultant mono-chloride substituted product with additional di-alkali metal salt of ethylene diamine di-acetic acid under the same conditions to effect its substitution for one amino hydrogen present in the second di-acetic acid salt.

6. The method of forming chain-like poly-ethylene poly-amino acids conforming to the structure defined by claim 1 which comprises heating an aqueous solution containing the di-sodium salt of ethylene diamine di-acetic acid and ethylene di-chloride in the relative proportions of 2 molar weights of the di-acetic acid to each molar weight of the di-chloride to a temperature approximating 75–80° C. for an extended time interval effective to complete the reaction therebetween, cooling the solution and acidifying the same to a pH at which the poly-molecular free acid is insolubilized and separating the free acid from the solution.

7. The method of forming chain-like polyethylene poly-amino acids conforming to the structure defined by claim 1 which comprises heating an aqueous solution containing the disodium salt of ethylene diamine di-acetic acid and ethylene di-chloride in the relative proportions of 2 molar weights of the di-acetic acid salt to one molar weight of the di-chloride, to a temperature of about 75–80° C. for an extended time interval effective to complete the reaction while maintaining a solution pH of from 8.5 to 9.0 by additions of an alkali metal hydroxide thereto.

FREDERICK C. BERSWORTH.

REFERENCES CITED

The following references are of record in the file of this patent:

UNITED STATES PATENTS

| Number | Name | Date |
|---|---|---|
| 2,168,181 | Ulrich et al. | Aug. 1, 1939 |
| 2,387,735 | Bersworth | Oct. 30, 1945 |
| 2,407,645 | Bersworth | Sept. 17, 1946 |
| 2,419,157 | Parry | Apr. 15, 1947 |

FOREIGN PATENTS

| Number | Country | Date |
|---|---|---|
| 46,892 | Netherlands | Oct. 16, 1939 |